United States Patent [19]

Nordquist, Jr. et al.

[11] Patent Number: 4,965,055
[45] Date of Patent: Oct. 23, 1990

[54] PREPARATION OF ULTRA-PURE METAL HALIDES

[75] Inventors: Paul E. R. Nordquist, Jr.; Arnold H. Singer, both of Alexandria, Va.

[73] Assignee: The United States of America as represented by the Secretary of the Navy, Washington, D.C.

[21] Appl. No.: 499,843

[22] Filed: Mar. 27, 1990

[51] Int. Cl.$^5$ .......................... C01B 9/00; C01B 9/08; C01G 1/00

[52] U.S. Cl. ..................................... 423/492; 423/22; 423/24; 423/49; 423/54; 423/63; 423/72; 423/100; 423/139; 423/489

[58] Field of Search ............... 423/492, 24, 70, 22, 423/49, 54, 100, 139, 72, 63, 489

[56] References Cited

U.S. PATENT DOCUMENTS 3,658,466  4/1972  Otsuka ................................. 423/70
3,998,924  12/1976  Jones et al. ......................... 423/100

FOREIGN PATENT DOCUMENTS 2607021  5/1988  France ................................. 423/139
7100806  3/1966  Japan .

*Primary Examiner*—Jeffrey E. Russel
*Assistant Examiner*—Brian M. Bolam
*Attorney, Agent, or Firm*—Thomas E. McDonnell; Barry A. Edelberg

[57] ABSTRACT

Metal halides are ultrapurified by selective complexation with a complexing agent to form a charged first complex. A ligand forms an oppositely charged second complex with metallic impurities in the metal halide to be purified. A solution containing these complexes is then passed through an ion exchange column and the desired purified metal halide collected. The present method is particularly useful in the production of ultra-pure metal halides, such as zirconium fluorinate, for metallic glasses.

20 Claims, No Drawings

PREPARATION OF ULTRA-PURE METAL HALIDES

BACKGROUND OF THE INVENTION

1. Field of the Invention

This invention relates, in general, to a method for material purification and, specifically, to a method for purification of metal halides.

2. Description of the Prior Art

Currently there are several schemes available for the ultra-purification of metal halides, especially metal fluorides used to make heavy metal fluoride glasses. However, current methods have not yet obtained the purity required for some application. For example, the purity levels thus far attained for metal halides fall short of those necessary for attainment of the theoretical minimum loss in a fluoride fiber of 0.01 dB/Km.

Wet chemical processing has limitations in the degree of purification because of recontamination from the background levels of contaminants present in the processing chemicals. Vapor preparation techniques are limited by low or non-existent thermodynamic driving force for removal of the contamination. The reactive atmosphere process (RAP) diminishes the hydroxyl content but has little effect on other contaminants.

Sublimation and distillation are separation techniques which have been used to purify heavy metal halides such as zirconium and hafnium tetrafluorides. These separation techniques are satisfactory for removing the majority of cation impurities found in commercially received material, such as the alkaline earth and rare earth impurities. However, sublimation and/or distillation have been only partially effective in removing iron impurities due to the relatively high vapor pressure of $Fe^{+3}$.

U.S. Pat. No. 4,578,252 discloses a method for preparing ultra-pure pure metal tetrafluorides. The disclosed method removes transition metal impurities from zirconium and hafnium tetrafluorides by converting iron cations to iron metal during distillation and sublimation. Using electromotive series displacement to displace the iron with zirconium, this method could produce metal tetrafluorides having iron impurity concentrations of below 1 ppm.

U.S. Pat. No. 4,741,752 disclosed a process for optical fiber in which Fe(II), which absorbs light of certain wavelength is converted to Fe(III), which absorbs light of different wavelengths. The conversion occurs in a melt of a halide glass composition by reaction with dry oxygen.

At present, the primary method of producing metal fluorides at the ppb purity level is via ion exchange. This method, while capable of producing material of high purity in large quantities, cannot achieve ultra-purification without encountering significantly increased cost and time and decreased efficiency.

SUMMARY OF THE INVENTION

Accordingly, an object of this invention is to obtain heavy metal halides of high purity.

Another object of this invention is to remove iron impurities down to the level of less than 500 ppb.

Also, an object of this invention is to produce halides of tantalum, niobium, hafnium and zirconium with group VIA, VIIA, VIIA, IB and IIB metal impurities of less than about 500 ppb.

Further, an object of this invention is to produce hafnium or zirconium halides with Co, Cu, Ni and Mn impurities of less than about 200 ppb.

Additionally, an object of this invention is to produce hafnium halides with Mn, Co, Ni and Cu total impurities of less than about 100 ppb (by weight).

A yet further object of this invention is to produce niobium halides having Co, Ni and Cu total impurities of less than 150 ppb.

These and other objects are accomplished by a process that combines selective complexation of the impurities in cationic or anionic form and complexation of the metal halide in the solution to form a complex of opposite charge, with subsequent removal of the impurity complex by retention on an ion exchange column.

DETAILED DESCRIPTION OF THE INVENTION

A solution is prepared comprising the halide of the metal to be purified ("matrix metal salt"), an effective amount of a complexing agent to form a charged complex with the desired metal halide, and an effective amount of a ligand to form a complex of opposite charge with the metallic impurities. Typically, the metal halide containing metallic impurities is dissolved in the presence of a complexing agent which complexes with the metal halide to form a soluble anionic or cationic complex containing the matrix metal. The presence of a strongly bonding ligand of the correct charge type allows the metallic impurities to form a complex having a charge opposite that of the complex containing the matrix metal.

The impurities in the metal halide form complexes with the ligand which stabilizes the ions of the metal impurity in a charge state different from that of the complex containing the matrix metal or in a state which has markedly different retention properties from the complex containing the matrix metal with respect to the ion exchange resin. Passing the solution down an ion exchange column which exchanges ions having the charge of the impurity complex removes the impurity metal complex. The complex containing the matrix metal passes through the column without retention. The efficiency and selectivity of the purification process can be improved by adjusting the pH of the solution and oxidizing or reducing either the metal matrix ions or the impurity ions.

Any metal halide where the metal component forms a stable charged complex containing its halogen partner X. (e.g., $ZrF_7^{3-}$, where X is fluorine), of a strength such that only the impurity metal remains free to bond with the ligand, may be purified according to the present invention. Preferred metal halides which may be purified according to the preferred embodiment of the present invention include group IVA and VA elements (i.e., Nb, Ta, Zr, Hf, Ti and V).

Preferably, the ligand stabilizes the impurity ions in a positive valence state so that they can be readily removed by a cation exchange column. In that preferred embodiment, the solution from which the metal halide is purified should contain sufficient halogen ions to form halometallate complexes with essentially all of the metal halide present. Halometallate complex formation maintains the matrix metal in an anionic charge state. Suitable ligands include phen [orthophenanthroline, $(C_{12}H_8N_2 \cdot H_2O)$]

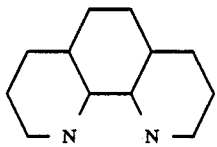

2,2'-dipyridyl (dpy)

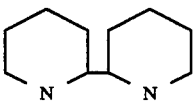

($C_{10}H_8N_2$), bathophenanthroline (bathophen)
($C_{24}H_{16}N_2$) or 3(2-pyridyl)-5,6-diphenyl-1,2-4-triazine,
$C_{20}H_{14}N_4$-(PDT)

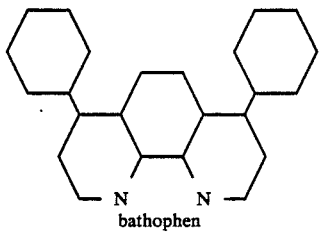
bathophen

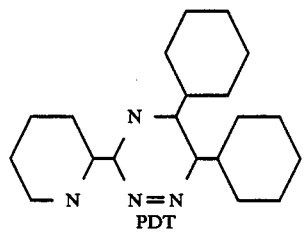
PDT and ethylenediamine, $H_2NCH_2CH_2NH_2$ ($C_2H_8N_2$). Relatively large ligands, for example $C_{12}$ to $C_{32}$, and especially those containing ring nitrogen, with plural and/or fused aromatic rings, such as phenanthroline ligands, are preferred but not required. Large ligands are preferred because larger ligands can usually bind metals with greater strength.

The selected ligand must form complexes of the metal impurity having a charge type opposite to the that of the matrix metal halide complex. Those ligands which form an impurity metal complex having the same charge-type as the matrix metal halide complexes do not enhance purification of the metal halide by ion exchange. For example, where the ligand functions by maintaining the impurity metal in a positively charged complex, not all ligands are suitable. In those embodiments, agents such as citrate or ethylenediaminetetraacetate (EDTA) are unsuitable because they form neutral or negatively charged (i.e., anionic) complexes with the impurity metal ions.

Where the matrix element is bound in an anionic complex and the impurity metal ions are present as cationic complex ions, the present process requires a cation exchange resin, typically one comprising a sulfonated styrene-divinylbenzene copolymer. These cation exchange resins are available commercially as BioRad AG50 ™ or Dowex 50 ™ resins. The specific cation resin chosen is not critical In general, the relative strength of the exchange resin may be varied to increase the selectivity of the separation process depending upon the stability of the matrix metal complex.

Too low a pH destroys the impurity/ligand complex by protonation of the ligand. For example, $H^+$ reacts readily with $M(phen)_3^{+3}$ to form $M(phen)_2^{+3}$ and phen $H^+$. By pH=1, most phen complexes are destroyed by protonation. Accordingly, the pH should be maintained above that which would protonate the ligand and destroy the impurity/ligand complex. High pH, on the other hand, can affect the process by precipitation of the matrix metal ion as a hydroxide, hydrated oxide, or similar form, along with perhaps some or all of the metal impurity. Therefore, the pH should be maintained below that at which such precipitation occurs. The effective pH range is a function of: (1) the stability with respect to pH of the matrix metal and (2) the stability, with respect to pH, of the complex of the impurity metal with the selected ligand. In general, the matrix metal will remain in solution at a pH of about 1 to 7, and the complex is suitably stable within about the same range, although complex stability is greatest at about pH 2 to 7. Time and temperature lack significant effect upon the process. The minimum and maximum pH for the use of any complex should be capable of determination using only routine experimentation or thermodynamic principles.

Oxidizing or reducing conditions which may cause the conversion of the metal impurity to an oxidation state with significantly lower column retention or reactivity with the ligand, respectively, must be avoided. For example, Co(III) complexes with phen more readily than does Co(II) and $Fe^{2+}$ complexes with phen more readily than does $Fe^{3+}$. In the case of iron, for example, a reducing agent, such as hydroxylamine hydrochloride, hydroquinone, ascorbic acid or sodium dithionite may be added to the solution to be purified to reduce the iron (III) impurity ions to the +2 valence state which is better complexed by phen. In the case of cobalt, the +3 valence state is to be preferred to the +2 state for complexing and ion-exchange removal. The oxidation of Co(II) to Co(III) is easily accomplished by passage of a stream of air through the solution. Any undesired effects of oxidizing or reducing conditions on the matrix element must also be avoided.

The solvent media, whether non-aqueous, aqueous, or mixed non-aqueous, can affect the retention of the cationic complex, as well as the necessary dissolution of the matrix element, impurity, and ligand. Fortunately, solvent behavior can be estimated from well-known thermodynamic principles and from chemical principles. These principles permit selection of the appropriate media, without undue experimentation, for virtually any combination of matrix metal, impurity, and ligand. Substitution of a miscible organic solvent (such as acetone or methyl alcohol for example) for a portion of the solvent water will increase the retention by the column of the impurity ions but will also increase the time taken to reach equilibrium and will decrease the solubility of the matrix fluoride in the solvent.

The proportion of the compound (e.g., $ZrF_4$, actually $ZrF_7^{-3}$ in solution with excess fluoride ion) to be purified in the solution is not critical. Essentially, the amount of matrix metal in solution is limited only by solubility. Nevertheless, more dilute solutions may be easier to handle than less dilute solutions and may approach chemical ideality more closely. The amount of complexing agent in the solution should be sufficient to form a complex containing essentially all of the metal halide to be purified. The molar ratio of ligand to impurities should be sufficient to complex essentially all of the impurities desired to be removed from the solution and will depend, in a predictable way, on the coordination number of the ligand and the valences of the impurities.

For example, consider phen as the ligand and $Fe^{2+}$ as the impurity to be removed from a solution of $ZrF_4$: In that instance, the molar ratio of ligand to metal impurity must be at least 3:1. If there were $1\times10^{-3}$ moles/liter (M) of $Fe^{2+}$, at least $3\times10^{-3}$ M phen must be present. If there were $1\times10^{-3}$ M $Fe^{2+}$ present and $2\times10^{-3}$ M phen $Ni^{2+}$ present, $9\times10^{-3}$ M phen would be required. ($1\times10^{-3}$ M + $2\times10^{-3}$ M = $3\times10^{-3}$ M and a 3 X molar quantity of phen gives $9\times10^{-3}$ M)

The present invention can remove several metallic impurities. The removable impurities include group VIA, VIIA, VIIIA, IB and IIB elements, such as Mn, Fe, Ni, Cu, Co, Ru and Rh, especially Fe, Ni, Cu, Co, Ru and Rh. The invention is particularly useful for removing Fe, Ni, Cu and Ru impurities, and is especially useful for removing Fe impurities. Of course, the impurity should be present, or manipulated (by oxidation or reduction) to be present, in a state which readily forms a complex of the desired charge under the selected separation conditions. The present invention may also be used to remove toxic or radioactive metal halides, such as a halide salt of radioactive cobalt, from a contaminated aqueous solution containing other valuable salts. When so used, recovery of the radioactive metal from the complex bound to the column would permit recycling of radioactive or otherwise toxic waste which might have escaped into the environment.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES

Example 1—Purification of $ZrF_4$

Ion exchange columns were prepared by passing a water slurry of the ion exchange resin (e.g., BioRad AG50 TM) through a polyethylene tube 0.7 cm (ID)×15 cm closed at one end with a stopcock.

The column was washed after preparation with water and with a sodium acetate solution (1% by weight) prior to use.

To 100 ml of a solution of $ZrF_4$ (5% by weight in 5% HF) containing 25 ppm Fe and 10 ppm impurities comprising Mn, Co, Cu and Ni, were added 5 ml of a solution of hydroxylamine hydrochloride (5% by weight in water). The pH of the solution was adjusted to 3 using sodium acetate solution and 15 ml of orthophenanthroline solution (0.5% by weight in water) was added. After standing 30 to 60 minutes, the solution was passed down the ion exchange column. After the solution was transferred to the column, the column was washed with three column volumes of 1% sodium acetate solution (pH adjusted to 3) then with three column volumes of water. The purified $ZrF_4$ was recovered from the column eluate by standard chemical procedures. Analysis of the product revealed 100 ppb Fe and 50 ppb of each Mn, Co, Cu and Ni.

Example 2—Purification of $HfF_4$

The pH of a solution (100 ml volume) of hafnium fluoride (4% $HfF_4$ by weight) in 6% HF, known to contain 20 ppm cobalt and 15 ppm each of nickel, copper and zinc, was adjusted to 3. After addition of 15 ml 0.5% ortho-phenanthroline, the solution was aspirated with an air stream for 30 min. After standing for one hour, the solution was passed down a column of BioRad AG50 TM prepared in example 1. $HfF_4$ was recovered from the solution by standard chemical techniques and was found by analysis to contain 0.06 ppm Co, 0.01 ppm Ni and 0.006 ppm Cu and Zn.

Example 3—Purification of $ZrF_4$ Using Mixed Solvent 300 ml zirconium fluoride of a 2% solution (weight basis) in a solvent comprising acetone, 10% acetone, 4% HF and 86% water were treated with ammonium hydroxide to a pH of 3.2. Contaminants known to be present in the solution include Fe (20 ppm), Cu (10 ppm) and Ni (6ppm). After addition of 20 ml of 0.5% hydroxylamine hydrochloride, the solution was passed down a column of BioRad AG50X TM conditioned, after preparation, using the solvent of this example. Analysis of the $ZrF_4$ prepared by this procedure indicated less than 100 ppb total metal ion impurities.

An advantage of this procedure is that, since the impurity levels are low, a relatively small ion exchange column can be used. Thus, the present invention is highly economical.

Although the present invention has been described above mostly with regard to the stabilization of the metal halide desired in an anionic complex and removal of the impurity as a stable cationic complex, it should be clear that the present invention may also be accomplished by stabilizing the desired metal halide as a cationic complex and the impurities as an anionic complex. The above teachings can be applied to that situation by analogy, without undue experimentation.

Obviously, numerous modifications and variations of the present invention are possible in light of the above teachings. It is therefore to be understood that within the scope of the appended claims, the invention may be practiced otherwise than as specifically described herein.

What is claimed is:

1. A method for removing a group VIA, VIIA, VIIIA, IB or IIB metal impurity from a halide of a group IVA or VA metal, comprising the steps of:
    preparing a solution comprising the halide of the metal to be purified, an amount of a complexing agent sufficient to form a first charged complex with any of said group IVA or VA metal, and a ligand which forms a second charged complex with said metal impurity in an amount sufficient to complex with essentially all of the metal impurity to be removed, said second charged complex having a charge opposite that of said first charged complex; and
    passing said solution containing said first charged complex and said second charged complex through an ion exchange column, bearing charged groups which retain said second charged group upon said column, whereby said second charged complex binds to said column and said first charged complex passes freely through said column.

2. A method for removing a group VIA, VIIA, VIIIA, IB or IIB metal impurity from a halide of a group IVA or VA metal, comprising the steps of:
preparing a solution comprising the halide of the metal to be purified, an amount of halide ions sufficient to anionically complex with any of said group IVA or VA metal, and a ligand which forms a cationic complex with said metal impurity in an amount sufficient to complex with essentially all of the metal impurity; and
passing said solution containing said cationic complex and said anionic complex through a cationic ion exchange column, whereby said cationic complex containing said metal impurity to be removed binds to said column and said anionic complex passes freely through said column.

3. The method of claim 2, further comprising the step of recovering the anionically complexed matrix metal from a solution which has passed through said column.

4. The method of claim 2, wherein said solution is maintained at a pH of about from 1 to 7.

5. The method of claim 4, wherein said solution is maintained at a pH of about from 2 to 7.

6. The method of claim 2, wherein said ligand is selected from the group consisting of orthophenanthroline, 2,2'-dipyridyl, bathophenanthroline, and 3(2-pyridyl)-5,6-diphenyl-1,2,4-triazine and ethylenediamine.

7. The method of claim 2, wherein said solution comprises an amount of reducing agent or oxidizing agent sufficient to render said metal impurity in a valence state which achieves maximum complex stability with said ligand and maximum retention on the ion exchange column.

8. The method of claim 7, wherein said reducing agent is hydroxylamine hydrochloride, hydroquinone, ascorbic acid or sodium dithionite.

9. The method of claim 2, wherein said metal halide is tantalum fluoride, niobium fluoride, hafnium fluoride or zirconium fluoride.

10. The method of claim 9, wherein said metal fluoride is hafnium fluoride or zirconium fluoride.

11. The method of claim 2, wherein said metal impurity is selected from the group consisting of Mn, Co, Ni, Cu, Ru, Fe, and Rh.

12. The method of claim 11, wherein said metal impurity is Fe, Ni, Cu or Ru.

13. The method of claim 12, wherein said metal impurity is Fe.

14. The method of claim 13, wherein said metal halide is $ZrF_4$.

15. The method of claim 2, wherein said metal halide is dissolved in aqueous or mixed aqueous/non-aqueous solution.

16. The method of claim 15, wherein said metal halide is dissolved in aqueous solution.

17. The method of claim 15, wherein said metal halide is $ZrF_4$ and said metal impurity is Fe.

18. A method for removing a group VIA, VIIA, VIIIA, IB and IIB metal impurity from a fluoride of a group IVA or VA metal, comprising the steps of:
preparing a solution of the metal fluoride to be purified, an amount of F sufficient to anionically complex with any of said group IVA or VA metal, and a ligand which forms a cationic complex with said metal impurity in an amount sufficient to complex with essentially all of the metal impurity; and
passing said solution containing said cationic complex and said anionic complex through a cationic ion exchange column, whereby said cationic complex containing said metal impurity binds to said column and said anionic complex passes freely through said column.

19. A method for removing a group VIA, VIIA, VIIIA, IB or IIB metal impurity from a halide of a group IVA or VA metal, comprising the steps of:
dissolving the halide of the metal to be purified in the presence of an amount of a complexing agent sufficient to form a first charged complex with any of said group IVA or VA metal, thus forming a solution;
adding to said solution containing said first charged complex a ligand which forms a second charged complex with said metal impurity, in an amount sufficient to complex with essentially all of the metal impurity to be removed, said second charged complex having a charge opposite that of said first charged complex; and
passing said solution containing said first charged complex and said second charged complex through an ion exchange column, bearing charged groups which retain said second charged group upon said column, whereby said second charged complex binds to said column and said first charged complex passes freely through said column.

20. The method of claim 19, wherein said complexing agent comprises halide ions and said ligand forms a cationic complex with said metal impurity.

* * * * *